United States Patent
Park et al.

(10) Patent No.: US 9,434,816 B2
(45) Date of Patent: *Sep. 6, 2016

(54) POLYAMIDE-IMIDE COPOLYMER FILM AND METHOD OF PREPARING POLYAMIDE-IMIDE COPOLYMER

(75) Inventors: Hyo Jun Park, Yongin-si (KR); Hak Gee Jung, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/409,895

(22) PCT Filed: Jun. 25, 2012

(86) PCT No.: PCT/KR2012/005002
§ 371 (c)(1),
(2), (4) Date: Jun. 3, 2015

(87) PCT Pub. No.: WO2014/003210
PCT Pub. Date: Jan. 3, 2014

(65) Prior Publication Data
US 2015/0299392 A1 Oct. 22, 2015

(51) Int. Cl.
*C08G 73/16* (2006.01)
*C08G 73/14* (2006.01)
*C08J 5/18* (2006.01)
*C09D 179/08* (2006.01)
*C08G 73/10* (2006.01)
*C08G 63/68* (2006.01)

(52) U.S. Cl.
CPC ............ *C08G 73/14* (2013.01); *C08G 73/1028* (2013.01); *C08G 73/1039* (2013.01); *C08J 5/18* (2013.01); *C09D 179/08* (2013.01); *C08J 2379/08* (2013.01)

(58) Field of Classification Search
CPC ...... C08G 73/14; C08L 79/08; C09D 179/08
USPC .................................. 528/180, 183, 184, 185
See application file for complete search history.

(56) References Cited

U.S. PATENT DOCUMENTS

| | | | |
|---|---|---|---|
| 5,071,948 A | 12/1991 | Khanna | |
| 5,821,319 A | 10/1998 | Shibuya et al. | |
| 9,200,117 B2 * | 12/2015 | Cho | C08G 73/14 |

FOREIGN PATENT DOCUMENTS

| | | |
|---|---|---|
| EP | 0 315 025 A1 | 5/1989 |
| JP | 10-316635 A | 12/1998 |
| JP | 2005-336243 A | 12/2005 |
| JP | 2012241196 A | 12/2012 |
| JP | 5799172 B2 | 10/2015 |
| KR | 10-2010-0109179 A | 10/2010 |
| KR | 10-2010-0115994 A | 10/2010 |

OTHER PUBLICATIONS

International Searching Authority, International Search Report for PCT/KR2012/005002 dated Feb. 21, 2013.
European Patent Office; Communication dated Jan. 25, 2016 in counterpart application No. 12880086.9.

* cited by examiner

*Primary Examiner* — Terressa Boykin
(74) *Attorney, Agent, or Firm* — Sughrue Mion, PLLC

(57) ABSTRACT

Disclosed herein is a polyamide-imide copolymer film, comprising a copolymer resin in which a unit structure derived from TFDB (2,2'-bis-trifluoromethyl-4,4'-biphenyl diamine), a unit structure derived from 6FDA (4,4'-(hexafluoroisopropylidene)diphthalic anhydride) and a unit structure derived from TPC (Terephthaloyl chloride; 1,4-benzenedicarbonyl chloride) are copolymerized.

5 Claims, 1 Drawing Sheet

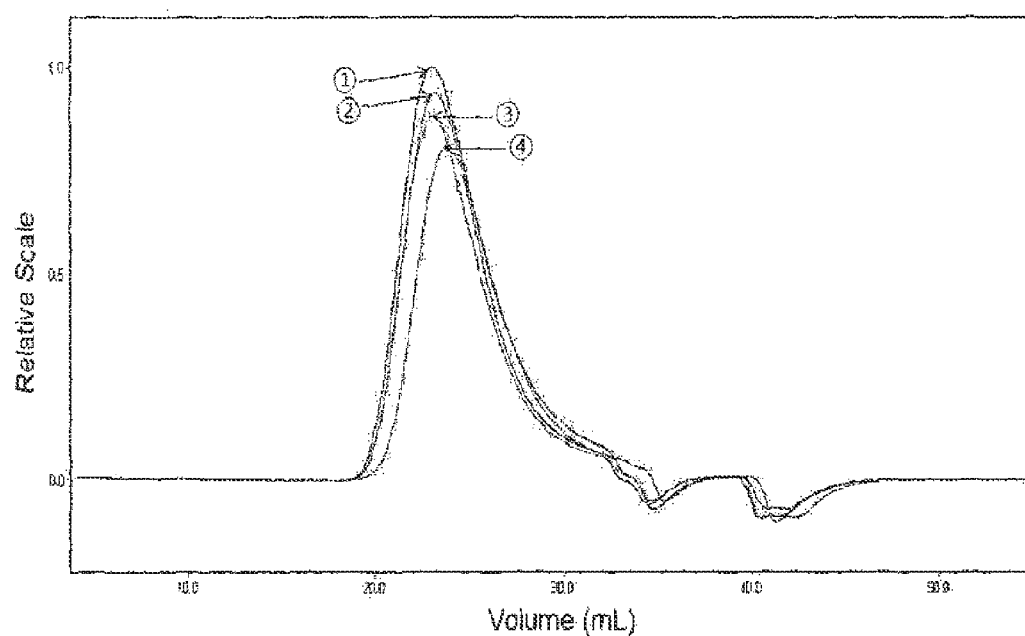

POLYAMIDE-IMIDE COPOLYMER FILM AND METHOD OF PREPARING POLYAMIDE-IMIDE COPOLYMER

CROSS REFERENCE TO RELATED APPLICATIONS

This application is a National Stage of International Application No. PCT/KR2012/005002 filed Jun. 25, 2012, the contents of which are incorporated herein by reference in their entirety.

TECHNICAL FIELD

The present invention relates to a polyamide-imide copolymer film and a method of preparing a polyamide-imide copolymer.

BACKGROUND ART

A polyimide film has excellent thermal and mechanical properties. Therefore, as the demand for materials for high temperature has increased, the use of polyimide films has been lately required. However, the use of polyimide films has been restricted because they are expensive.

In particular, recently, polyimide films having excellent thermal and mechanical properties as well as optical properties have attracted considerable attention in the field of displays.

Thus, as the demand for polyimide films which have excellent thermal, mechanical and optical properties and which are cheaper has increased, attempts to mix polyamide with polyimide which is the main material of a polyimide film or to copolymerize a polyamide with a polyimide have been made.

However, currently, polyamide-imide copolymer films satisfying optical properties as well as thermal and mechanical properties are not on the market yet.

DISCLOSURE OF INVENTION

Technical Problem

Accordingly, the present invention has been made to solve the above-mentioned problems, and an object of the present invention is to provide a polyamide-imide copolymer film having excellent thermal, mechanical and optical properties, and a method of preparing a polyamide-imide copolymer.

Solution to Problem

In order to accomplish the above object, an aspect of the present invention provides a polyamide-imide copolymer film, including a copolymer resin in which a unit structure derived from TFDB (2,2'-bis-trifluoromethyl-4,4'-biphenyl diamine), a unit structure derived from 6FDA (4,4'-(hexafluoroisopropylidene)diphthalic anhydride) and a unit structure derived from TPC (terephthaloyl chloride; 1,4-benzenedicarbonyl chloride) are copolymerized.

Another aspect of the present invention provides a method of preparing a polyamide-imide copolymer, including the step of: solution-reacting TFDB with 6FDA to prepare a first polymer, and then solution-reacting the first polymer with TPC to prepare polyamic acid; and imidizing the polyamic acid in the presence of an imidization catalyst.

Advantageous Effects of Invention

The present invention provides a polyamide-imide copolymer film having excellent thermal, mechanical and optical properties, and a method of preparing a polyamide-imide copolymer.

BRIEF DESCRIPTION OF DRAWINGS

The above and other objects, features and other advantages of the present invention will be more clearly understood from the following detailed description taken in conjunction with the accompanying drawing, in which:

FIG. 1 is a graph showing the results of GPC-RI analysis of a polyamide-imide copolymer according to examples of the present invention.

BEST MODE FOR CARRYING OUT THE INVENTION

The present invention provides a polyamide-imide copolymer film, including a copolymer resin in which a unit structure derived from TFDB (2,2'-bis-trifluoromethyl-4,4'-biphenyl diamine), a unit structure derived from 6FDA (4,4'-(hexa-fluoroisopropylidene)diphthalic anhydride) and a unit structure derived from TPC (terephthaloyl chloride; 1,4-benzenedicarbonyl chloride) are copolymerized. Here, the copolymer resin may have a weight average molecular weight of 10,000~400,000.

That is, the polyamide-imide copolymer film according to the present invention includes: a polymer of a unit structure derived from TFDB and a unit structure derived from TPC as a polyamide component; and a polymer of a unit structure derived from TFDB and a unit structure derived from 6FDA as a polyimide component. In the polyamide-imide copolymer film, both the polyamide component and the polyimide component include TFDB as a diamine-based unit structure. For this reason, the polyimide component has a high glass transition temperature and exhibits excellent optical properties and high solubility, and the polyamide component has a low thermal expansion coefficient and exhibits excellent mechanical properties, thus manufacturing a transparent film having excellent thermal resistance.

Further, the polyamide component and the polyimide component are copolymerized with each other, so that excellent thermal and mechanical properties of the polyimide component and excellent optical properties of the polyamide component are combined together, with the result that the polyamide-imide copolymer can exhibit the characteristics of a single copolymer.

Here, the copolymer resin may prepared by copolymerizing a unit structure derived from TFDB, a unit structure derived from 6FDA and a unit structure derived from TPC in a molar ratio of 1:0.2~0.8:0.8~0.2, so that the characteristics of each of the polyamide component and the polyimide component can be significantly exhibited.

More preferably, the copolymer resin may be prepared by copolymerizing a unit structure derived from TFDB, a unit structure derived from 6FDA and a unit structure derived from TPC in a molar ratio of 1:0.3~0.7:0.7~0.3, so that the optical properties of the polyamide component and the thermal and mechanical properties of the polyimide component can be optimized.

When the molar ratio of the unit structure derived from TPC is less than 0.2, the thermal resistance thereof is slightly improved, so that it may be difficult to exhibit the characteristics of the polyamide component. Further, when the molar ratio thereof is more than 0.8, the degree of polymerization cannot be easily controlled during the copolymerization of the unit structures, so that it may be difficult to manufacture a material exhibiting uniform properties. Therefore, when the molar ratio of the unit structure derived from TPC is less than 0.3~0.7, the physical properties of the polyamide component and the polyimide component are uniformly exhibited, so that the polyamide-imide copolymer film can exhibit optimal thermal, mechanical and optical properties.

Further, the present invention provides a method of preparing a polyamide-imide copolymer, including the step of: solution-reacting TFDB with 6FDA to prepare a first polymer, and then solution-reacting the first polymer with TPC to prepare polyamic acid; and imidizing the polyamic acid in the presence of an imidization catalyst.

That is, in the method of preparing a polyamide-imide copolymer, in the process of preparing polyamic acid, TFDB and 6FDA are solution-reacted to polymerize a polyimide component, and then TPC is added to polymerize a polyamide component. That is, the polyimide component is polymerized, and then the polymerized polyimide component is copolymerized with the polyamide component.

When the polyamide component is first polymerized, the polymerized polyamide component does not uniformly react with the subsequently-introduced polyimide component because the viscosity of the polymerized polyamide component is rapidly increased, and the prepared polyamic acid solution becomes white and turbid to cause phase separation because the solubility of the polyamide component is lower than the solubility of the polyimide component. Therefore, it is advantageous for the polyimide component to first be polymerized.

In the process of preparing polyamic acid, the solution-reaction of TFDB with 6FDA may be conducted such that a molar ratio of FTDB:6FDA is 100 mol %:X mol %, and the solution-reaction of the first polymer with TPC may be conducted such that a molar ratio of the first polymer:TPC is 100 mol %:100–X mol % (X is 20~80, and preferably 30~70).

Here, in the process of imidizing the polyamic acid, the imidization catalyst may be a commonly-used imidization catalyst, and pyridine and acetic anhydride can be used together.

The polyamide-imide copolymer film according to the present invention can be manufactured by a general polyimide film forming method using the polyamide-imide copolymer obtained by the method of preparing a polyamide-imide copolymer according to the present invention.

MODE FOR THE INVENTION

Hereinafter, the present invention will be described in detail with reference to the following Examples. Here, these examples are set forth to illustrate the present invention, and the scope of the present invention is not limited thereto.

Example 1

Preparation of Polyamide-Imide Copolymer

A 1.5 L reactor provided with a stirrer, nitrogen injector, a dropping funnel, a temperature controller and a cooler was charged with 812 g of N,N-dimethylacetamide (DMAc) while passing nitrogen through the reactor, and the temperature of the reactor was set to 25° C. Subsequently, 64.046 g (0.2 mol) of TFDB was dissolved in DMAc to obtain a first solution, and the temperature of the first solution was maintained at 25° C. Subsequently, 71.08 g (0.16 mol) of 6FDA was added to the first solution, and then stirred for 1 hour to be dissolved and reacted to obtain a second solution. In this case, the temperature of the second solution was maintained at 25° C. Then, 8.1208 g (0.04 mol) of TPC was added to the second solution to obtain a polyamic acid solution having a solid content of 15 wt %.

Subsequently, the polyamic acid solution was stirred at room temperature for 2 hours, and then 27.8 g of pyridine and 35.9 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 128 g of a solid-powdered polyamide-imide copolymer.

The weight average molecular weight of the polyamide-imide copolymer obtained in this way was measured, and the weight average molecular weight thereof was determined to be 170,000. FIG. 1 is a graph showing the results of GPC-RI analysis of the polyamide-imide copolymer. Referring to FIG. 1, it can be seen that reactants are synthesized as a copolymer, in light of the single peak that appears as represented by ④ in the graph of FIG. 1.

Manufacture of Polyamide-Imide Copolymer Film 128 g of the solid-powdered polyamide-imide copolymer was dissolved in 512 g of N,N-dimethylacetamide (DMAc) to obtain 20 wt % of a solution. The obtained solution was applied onto a stainless plate, cast to a thickness of 700 μm, and then dried using hot air at 130° C. for 30 minutes to form a film. Subsequently, the film was detached from the stainless plate, and then fixed on a frame by a pin. Thereafter, the frame fixed with the film was put into a vacuum oven, slowly heated from 100° C. to 300° C. for 2 hours, and then slowly cooled to separate the film from the frame, thereby obtaining a polyamide-imide copolymer film. Thereafter, the obtained polyamide-imide copolymer film was heat-treated at 300° C. for 30 minutes (thickness: 100 μm).

Example 2

Preparation of Polyamide-Imide Copolymer

The reactor of Example 1 was charged with 785 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 62.195 g (0.14 mol) of 6FDA was added to the first solution, and then stirred for 1 hour to be dissolved and reacted to obtain a second solution. In this case, the temperature of the second solution was maintained at 25° C. Then, 12.1812 g (0.06 mol) of TPC was added to the second solution to obtain a polyamic acid solution having a solid content of 15 wt %.

Subsequently, the polyamic acid solution was stirred at room temperature for 8 hours, and then 25 g of pyridine and 32 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 124 g of a solid-powdered polyamide-imide copolymer.

The weight average molecular weight of the polyamide-imide copolymer obtained in this way was measured, and the weight average molecular weight thereof was determined to be 200,000.

Manufacture of Polyamide-Imide Copolymer Film 124 g of the solid-powdered polyamide-imide copolymer was dissolved in 496 g of N,N-dimethylacetamide (DMAc) to obtain 20 wt % of a solution.

Thereafter, a polyamide-imide copolymer film was manufactured using the solution in the same manner as in Example 1.

Example 3

Preparation of Polyamide-Imide Copolymer

The reactor of Example 1 was charged with 753 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 53.31 g (0.12 mol) of 6FDA was added to the first solution, and then stirred for 1 hour to be dissolved and reacted to obtain a second solution. In this case, the temperature of the second solution was maintained at 25° C. Then, 16.2416 g (0.08 mol) of TPC was added to the second solution to obtain a polyamic acid solution having a solid content of 15 wt %.

Subsequently, the polyamic acid solution was stirred at room temperature for 8 hours, and then 21 g of pyridine and 27 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 120 g of a solid-powdered polyamide-imide copolymer.

The weight average molecular weight of the polyamide-imide copolymer obtained in this way was measured, and the weight average molecular weight thereof was determined to be 251,000. FIG. 1 is a graph showing the results of GPC-RI analysis of the polyamide-imide copolymer. Referring to FIG. 1, it can be seen that reactants are synthesized as a copolymer, in light of the single peak that appears as represented by ③ in the graph of FIG. 1.

Manufacture of Polyamide-Imide Copolymer Film 120 g of the solid-powdered polyamide-imide copolymer was dissolved in 480 g of N,N-dimethylacetamide (DMAc) to obtain 20 wt % of a solution.

Thereafter, a polyamide-imide copolymer film was manufactured using the solution in the same manner as in Example 1.

Example 4

Preparation of Polyamide-Imide Copolymer

The reactor of Example 1 was charged with 725 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 44.425 g (0.1 mol) of 6FDA was added to the first solution, and then stirred for 1 hour to be dissolved and reacted to obtain a second solution. In this case, the temperature of the second solution was maintained at 25° C. Then, 20.3 g (0.10 mol) of TPC was added to the second solution to obtain a polyamic acid solution having a solid content of 15 wt %.

Subsequently, the polyamic acid solution was stirred at room temperature for 8 hours, and then 17.4 g of pyridine and 22.5 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 115 g of a solid-powdered polyamide-imide copolymer.

The weight average molecular weight of the polyamide-imide copolymer obtained in this way was measured, and the weight average molecular weight thereof was determined to be 250,000.

Manufacture of Polyamide-Imide Copolymer Film 115 g of the solid-powdered polyamide-imide copolymer was dissolved in 460 g of N,N-dimethylacetamide (DMAc) to obtain 20 wt % of a solution.

Thereafter, a polyamide-imide copolymer film was manufactured using the solution in the same manner as in Example 1.

Example 5

Preparation of Polyamide-Imide Copolymer

The reactor of Example 1 was charged with 703 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 35.54 g (0.08 mol) of 6FDA was added to the first solution, and then stirred for 1 hour to be dissolved and reacted to obtain a second solution. In this case, the temperature of the second solution was maintained at 25° C. Then, 24.36 g (0.12 mol) of TPC was added to the second solution to obtain a polyamic acid solution having a solid content of 15 wt %.

Subsequently, the polyamic acid solution was stirred at room temperature for 8 hours, and then 14 g of pyridine and 18 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 111 g of a solid-powdered polyamide-imide copolymer.

The weight average molecular weight of the polyamide-imide copolymer obtained in this way was measured, and the weight average molecular weight thereof was determined to be 253,400. FIG. 1 is a graph showing the results of GPC-RI analysis of the polyamide-imide copolymer. Referring to FIG. 1, it can be seen that reactants are synthesized as a copolymer in light of the single peak that appears as represented by ② in the graph of FIG. 1.

Manufacture of Polyamide-Imide Copolymer Film 111 g of the solid-powdered polyamide-imide copolymer was dissolved in 444 g of N,N-dimethylacetamide (DMAc) to obtain 20 wt % of a solution.

Thereafter, a polyamide-imide copolymer film was manufactured using the solution in the same manner as in Example 1.

Example 6

Preparation of Polyamide-Imide Copolymer

The reactor of Example 1 was charged with 675 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 26.655 g (0.06 mol) of 6FDA was added to the first solution, and then stirred for 1 hour to be dissolved and reacted to obtain a second solution. In this case, the temperature of the second solution was maintained at 25° C. Then, 28.42 g (0.14 mol) of TPC was added to the second solution to obtain a polyamic acid solution having a solid content of 15 wt %.

Subsequently, the polyamic acid solution was stirred at room temperature for 8 hours, and then 11 g of pyridine and 13.5 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 107 g of a solid-powdered polyamide-imide copolymer.

The weight average molecular weight of the polyamide-imide copolymer obtained in this way was measured, and the weight average molecular weight thereof was determined to be 310,000. FIG. 1 is a graph showing the results of GPC-RI analysis of the polyamide-imide copolymer. Referring to FIG. 1, it can be seen that reactants are synthesized as a copolymer, considering that a single peak appears as represented by ① in the graph of FIG. 1.

Manufacture of Polyamide-Imide Copolymer Film 107 g of the solid-powdered polyamide-imide copolymer was dissolved in 428 g of N,N-dimethylacetamide (DMAc) to obtain 20 wt % of a solution.

Thereafter, a polyamide-imide copolymer film was manufactured using the solution in the same manner as in Example 1.

Example 7

Preparation of Polyamide-Imide Copolymer

The reactor of Example 1 was charged with 648 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 17.77 g (0.04 mol) of 6FDA was added to the first solution, and then stirred for 1 hour to be dissolved and reacted to obtain a second solution. In this case, the temperature of the second solution was maintained at 25° C. Then, 32.48 g (0.16 mol) of TPC was added to the second solution to obtain a polyamic acid solution having a solid content of 15 wt %.

Subsequently, the polyamic acid solution was stirred at room temperature for 8 hours, and then 21 g of pyridine and 27 g of acetic anhydride were added to the stirred polyamic acid solution, stirred for 30 minutes, further stirred at 80° C. for 1 hour and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 102 g of a solid-powdered polyamide-imide copolymer.

The weight average molecular weight of the polyamide-imide copolymer obtained in this way was measured, and the weight average molecular weight thereof was determined to be 227,000.

Manufacture of Polyamide-Imide Copolymer Film 102 g of the solid-powdered polyamide-imide copolymer was dissolved in 408 g of N,N-dimethylacetamide (DMAc) to obtain 20 wt % of a solution.

Thereafter, a polyamide-imide copolymer film was manufactured using the solution in the same manner as in Example 1.

Comparative Example 1

Preparation of Polyimide

A reactor was charged with 611 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 88.85 g (0.2 mol) of 6FDA was added to the first solution to obtain a polyamic acid solution having a solid content of 20 wt %.

Subsequently, the polyamic acid solution was stirred at room temperature for 8 hours, and then 31.64 g of pyridine and 40.91 g of acetic anhydride were added to the stirred polyamic acid solution, it was stirred for 30 minutes, and further stirred at 80° C. for 2 hours and then cooled to room temperature. Subsequently, the resultant solution was slowly dropped into a container charged with 20 L of methanol to obtain a solid precipitate. Finally, the solid precipitate was filtered, pulverized and then dried in a vacuum at 100° C. for 6 hours to obtain 136 g of polyimide powder.

Manufacture of Polyimide Film 136 g of the polyimide powder was dissolved in 496 g of N,N-dimethylacetamide (DMAc) to obtain 20 wt % of a solution. Thereafter, a polyimide film was manufactured using the solution in the same manner as in Example 1.

Comparative Example 2

Preparation of Polyamide

A 2 L reactor was charged with 1203 g of N,N-dimethylacetamide (DMAc), and the temperature of the reactor was set to 25° C. Subsequently, 64.046 g (0.2 mol) of TFDB was dissolved in DMAc to obtain a first solution, and the temperature of the first solution was maintained at 25° C. Subsequently, 40.6 g (0.2 mol) of 6FDA was added to the first solution, and then stirred for 1 hour to be dissolved and reacted while maintaining the temperature of the first solution to obtain a polyamic acid solution having a solid content of 8 wt %. Subsequently, the polyamic acid solution was slowly dropped into a container charged with 20 L of distilled water to obtain a solid precipitate. Finally, the solid precipitate was filtered, pulverized and then dried in a vacuum at 100° C. for 6 hours to obtain 101 g of polyamide powder.

Manufacture of Polyamide Film 101 g of the polyamide powder was dissolved in 1161 g of N,N-dimethylacetamide (DMAc) to obtain 8 wt % of a solution. Thereafter, a polyamide film was manufactured using the solution in the same manner as in Example 1.

<Evaluation of Physical Properties>

(1) Average Transmittance

The average transmittance of each of the films manufactured in the Examples at a wavelength of 380~780 nm was measured using a UV spectrometer (CM-3700D, manufactured by Konica Minolta Corp.)

(2) Yellow Index (Y.I.)

The yellow indexes of the films manufactured in the Examples at a wavelength of 380~780 nm was measured using a UV spectrometer (CM-3700D, manufactured by Konica Minolta Corp.) according to the ASTM E313 standards.

(3) Thermal Expansion Coefficient (CTE)

The thermal expansion coefficients (CTEs) of the films manufactured in the Examples at 50~260° C. were measured using a thermo-mechanical analyzer (Diamond TMA, manufactured by Perkin Elmer Corp.) twice under conditions of a heating rate of 10° C./min and a load of 100 mN. Here, the first measurements were excluded, and the second measurements were used. The reason for this is that, since there can be residual stress present in the films because of the heat treatment of the films, the second measurement must be conducted after the residual stress has been completely removed by the first measurement.

(4) Thickness

The thickness of each of the films manufactured in the Examples was measured using an anritsu electronic micrometer. Here, the deviation of the anritsu electronic micrometer is 0.5% or less.

The results of the evaluation of the physical properties of the films of Examples 1 to 7 and Comparative Examples 1 and 2 are shown in Table 1 below.

TABLE 1

| | Thickness (μm) | Average transmittance (%) | Y.I. | CTE (ppm/° C.) |
|---|---|---|---|---|
| Comp. Exp. 1 | 50 | 90.8 | 2.2 | 65 |
| Exp. 1 | 50 | 90.3 | 2.4 | 58 |
| Exp. 2 | 50 | 90.1 | 2.5 | 52 |
| Exp. 3 | 50 | 89.8 | 2.8 | 47 |
| Exp. 4 | 50 | 89.8 | 2.8 | 42 |
| Exp. 5 | 50 | 89.6 | 3.0 | 37 |
| Exp. 6 | 50 | 89.6 | 3.1 | 24 |
| Exp. 7 | 50 | 89.5 | 4.2 | 24 |
| Comp. Exp. 2 | 35 | 84 | 10 | 12 |

The evaluation of the physical properties shows that when the polyamide-imide copolymer films of Examples are compared with the polyimide film of Comparative Example 1, in terms of optical characteristics, the yellow indexes of the polyamide-imide copolymer films are increased, and the average transmittance thereof is gradually decreased. The reason for this is that it is easy for a polyamide component to form a charge-transfer complex between molecules or within a molecule compared to a polyimide component. In contrast, it can be ascertained that the thermal expansion coefficients of the polyamide-imide copolymer films are greatly lowered. The reason for this is thought to be that the polyamide component including TFDB and TPC has high rigidity, which prevents the polyimide component having a relatively high thermal expansion coefficient from expanding.

Comparing the polyamide-imide copolymer film of Example 7 with that of Example 6, it can be seen that the thermal expansion coefficient of the polyamide-imide copolymer film of Example 7 barely changes despite the increase in the content of the polyamide component. The reason for this is that, as the content of the polyamide component is increased, the viscosity of the polyamide-imide copolymer film rapidly increases, so that it is difficult to control the degree of polymerization, with the result that the polymerization reaction does not sufficiently take place.

The polyamide film of Comparative Example 2 has a high thermal expansion coefficient, but has poor optical properties, and cannot be easily handled during a film forming process because its viscosity is high. Even when its viscosity is lowered in order to easily perform a film forming process, its concentration is excessively low, and thus the thickness of the film cannot be increased. Nevertheless, when the thickness of the film is increased, its optical transmittance and yellow index are rapidly deteriorated, and thus the film cannot be easily used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polyamide-imide copolymer film, comprising a copolymer resin which is obtained by copolymerizing a unit structure derived from (2,2'-bis-trifluoromethyl-4,4'-biphenyl diamine (TFDB), a unit structure derived from (4,4'-(hexa-fluoroisopropylidene)diphthalic anhydride (6FDA) and a unit structure derived from terephthaloyl chloride (TPC), wherein the copolymer resin contains the unit structure derived from TFDB, the unit structure derived from 6FDA, and the unit structure derived from TPC in a molar ratio of 1:0.2-0.8:0.8-0.2.

2. The polyamide-imide copolymer film of claim 1, wherein the copolymer resin is a copolymer resin in which the unit structure derived from TFDB, the unit structure derived from 6FDA and the unit structure derived from TPC are copolymerized in a molar ratio of 1:0.3-0.7:0.7-0.3.

3. The polyamide-imide copolymer film of claim 1, wherein the copolymer resin has a weight average molecular weight of 10,000-400,000.

4. A method of preparing a polyamide-imide copolymer, comprising the step of:
   solution-reacting 2,2'-bis-trifluoromethyl-4,4'-biphenyl diamine (TFDB) with 4,4'-(hexa-fluoroisopropylidene) diphthalic anhydride (6FDA) to prepare a first polymer, and then solution-reacting the first polymer with terephthaloyl chloride (TPC) to prepare polyamic acid; and
   imidizing the polyamic acid in the presence of an imidization catalyst,
   wherein the copolymer resin is a copolymer resin in which the unit structure derived from TFDB, the unit structure derived from 6FDA, and the unit structure derived from TPC are copolymerized in a molar ratio of 1:0.2-0.8:0.8-0.2.

5. The method of claim 4, wherein, in the step of preparing the polyamic acid, the solution-reaction of TFDB with 6FDA is conducted such that a molar ratio of FTDB: 6FDA is 100 mol %: X mol %, and the solution-reaction of the first polymer with TPC is conducted such that a molar ratio of the first polymer: TPC is 100 mol %: 100−X mol %, wherein X is 20-80.

* * * * *